US008261253B2

(12) United States Patent
Brehm et al.

(10) Patent No.: US 8,261,253 B2
(45) Date of Patent: Sep. 4, 2012

(54) METHOD FOR RESTORING SOFTWARE APPLICATIONS ON DESKTOP COMPUTERS

(75) Inventors: Eric E. Brehm, Bothell, WA (US); Jeff T. Flenoy, Everett, WA (US); Kirk K. Wong, Monroe, WA (US); Michael T. Reese, Freeland, WA (US); Dustin R. Coe, Freeland, WA (US)

(73) Assignee: The Boeing Company, Chicago, IL (US)

( * ) Notice: Subject to any disclaimer, the term of this patent is extended or adjusted under 35 U.S.C. 154(b) by 1233 days.

(21) Appl. No.: 11/340,804

(22) Filed: Jan. 25, 2006

(65) Prior Publication Data

US 2007/0174832 A1 Jul. 26, 2007

(51) Int. Cl.
*G06F 9/44* (2006.01)
*G06F 9/445* (2006.01)
*G06F 11/00* (2006.01)

(52) U.S. Cl. ........ 717/168; 717/174; 717/175; 717/176; 714/15

(58) Field of Classification Search .......... 717/173, 717/170; 714/15
See application file for complete search history.

(56) References Cited

U.S. PATENT DOCUMENTS

| | | | | |
|---|---|---|---|---|
| 5,586,304 A * | 12/1996 | Stupek et al. | ................. | 717/170 |
| 5,999,740 A * | 12/1999 | Rowley | ......................... | 717/173 |
| 6,009,274 A * | 12/1999 | Fletcher et al. | ............... | 717/173 |
| 6,363,499 B1 * | 3/2002 | Delo et al. | ..................... | 714/15 |
| 6,588,011 B1 * | 7/2003 | Giammaria | ................... | 717/174 |
| 6,615,405 B1 * | 9/2003 | Goldman et al. | ............. | 717/174 |
| 6,633,978 B1 * | 10/2003 | Angelo et al. | ................ | 713/100 |
| 6,640,317 B1 * | 10/2003 | Snow | .............................. | 714/38 |
| 6,757,289 B1 * | 6/2004 | Cain et al. | ..................... | 370/401 |
| 6,820,214 B1 * | 11/2004 | Cabrera et al. | .................. | 714/15 |
| 7,257,583 B2 * | 8/2007 | Hofmeister et al. | ............ | 707/10 |
| 7,770,164 B2 * | 8/2010 | Schuelein et al. | ............. | 717/168 |
| 7,836,337 B1 * | 11/2010 | Wu et al. | ......................... | 714/15 |
| 7,840,955 B1 * | 11/2010 | Weathersby et al. | .......... | 717/168 |
| 8,006,241 B2 * | 8/2011 | Dias | ............................. | 717/174 |

(Continued)

FOREIGN PATENT DOCUMENTS

EP 0 841 615 A2 5/1998

(Continued)

OTHER PUBLICATIONS

K. Scott et al. "Retargetable and Reconfigurable Software Dynamic Translation", [Online], 2003, pp. 1-12, [Retrieved form Internet on Apr. 19, 2012], <ftp://130.49.220.34/pub/web/projects/coco/papers/strata-cgo03.pdf>.*

(Continued)

*Primary Examiner* — Thuy Dao
*Assistant Examiner* — Ziaula A Chowdhury
(74) *Attorney, Agent, or Firm* — Parsons Behle & Latimer

(57) ABSTRACT

An automated method is provided for restoring software applications installed on a desktop computer. Information identifying an inventory of software applications resident on the computer is stored locally in a file on the computer. In response to a request to restore applications, the inventory is compared to a master library of known software applications, and those applications in the inventory that are found in the library are selected and downloaded onto the computer to complete the restoration process.

19 Claims, 3 Drawing Sheets

U.S. PATENT DOCUMENTS

| | | | |
|---|---|---|---|
| 2002/0104080 A1* | 8/2002 | Woodard et al. | 717/176 |
| 2003/0066065 A1 | 4/2003 | Larkin | |
| 2004/0010786 A1* | 1/2004 | Cool et al. | 717/170 |
| 2005/0010916 A1* | 1/2005 | Hagen et al. | 717/170 |
| 2005/0044544 A1* | 2/2005 | Slivka et al. | 717/174 |
| 2005/0235281 A1* | 10/2005 | Lefrancois | 717/175 |
| 2005/0257214 A1* | 11/2005 | Moshir et al. | 717/171 |
| 2005/0273779 A1* | 12/2005 | Cheng et al. | 717/168 |
| 2005/0289533 A1* | 12/2005 | Wang et al. | 717/168 |
| 2007/0169090 A1* | 7/2007 | Kang | 717/168 |

FOREIGN PATENT DOCUMENTS

| | | |
|---|---|---|
| EP | 1 148 417 A2 | 10/2001 |
| EP | 1 553 492 A2 | 7/2005 |
| WO PCT/US2006/0435649 | | 7/2006 |

OTHER PUBLICATIONS

Stephen Manley et al. "Logical vs. Physical File System Backup", [Online], Feb. 1999, pp. 1-12, [Retrieved from Internet on Apr. 19, 2012], <http://bnrg.eecs.berkeley.edu/~randy/Courses/CS294.F07/9.1.pdf>.*

Jaap Boender et al., "Improving the maintenance of free software distributions",[Online], 2006, pp. 1-12, [Retrieved from Internet on Apr. 19, 2012], <http://citeseerx.ist.psu.edu/viewdoc/download?doi=10.1.1.175.2787&rep=rep1&type=pdf>.*

Christopher Jones et al., "Approaches to Computer Lab Management: Lockdown vs. Freedom", [Online], 2000, pp. 127-129, [Retrieved from Internet on Apr. 19, 2012], <http://telecom.oit.umass.edu/intranet/siguccs2000/docs/p127.pdf>.*

* cited by examiner

METHOD FOR RESTORING SOFTWARE APPLICATIONS ON DESKTOP COMPUTERS

FIELD OF THE INVENTION

This invention generally relates to maintenance of software applications, especially those installed in desktop computers in networked systems, and deals more particularly with a method for restoring applications previously installed on the computers.

BACKGROUND OF THE INVENTION

Software applications resident on desktop computers in networked systems frequently require updates or restoration for a variety of reasons. The applications may become damaged or corrupted, and components such as drivers may be occasionally lost. Moreover, upgrades of hardware components of the computer may necessitate compatible software upgrades.

The problem of maintaining software applications for user clients in large network systems is problematic for system administrators since they do not always know which software applications and versions thereof are installed in each of the desktop computers in the network. Similarly, administrators do not always know which of the computers may have received hardware changes requiring related software upgrades. Likewise, when a client replaces a desktop computer, the administrator is faced with the problem of determining which version of a software application should be installed on the new computer. This process of determining which software applications and versions should be restored on computers is time consuming and requires manual effort by system administrators.

Accordingly, there is a need in the art for a method for restoring software applications on desktop computers which overcomes the deficiencies of the prior art discussed above. The present invention is directed toward satisfying this need.

SUMMARY OF THE INVENTION

In accordance with one aspect of the invention, a method is provided for restoring software applications installed on a desktop computer, comprising the steps of: storing information representing an inventory of the applications installed on the computer; providing a library of known software applications; receiving a request to restore one or more applications on the computer; and, restoring those applications in the stored inventory that are present in the library.

The method of the present invention is implemented automatically and without manual intervention of a system administrator. Applications installed on each desktop computer are tracked on the computer in a local file that is used to support the detection process in which all the applications are detected and are stored for future reference.

The method of the present invention employs predefined scripted elements to examine each desktop client for all known applications that are installed on the client's computer. The installed application information is collected and stored in a database. When a request is received to restore applications onto the client, the previously stored client application information is compared against a library of all known software applications. The application library is typically managed by an administrator who imposes rules on the use of each application in the library. The process restores all previously detected applications that are found within the software application library, consistent with the rules imposed by the system administrator. The automatic detection and restoration process can be run from within a networked system, or from a non-networked environment, such as a USB drive or a DVD.

In accordance with another aspect of the invention, a method is provided for restoring software applications installed on a desktop computer, comprising the steps of: providing a library of software applications; storing information on the computer identifying the software applications installed on the computer; reading the stored information; matching the applications identified by the information that has been with the applications in the library; and, installing software applications from the library based on resulting matches.

In accordance with still another aspect of the invention, a method is provided for restoring software applications installed on a computer, comprising the steps of: generating a database representing an inventory of software applications previously installed on the computer; generating a master library of software applications that include the software applications previously installed in the computer; receiving a request to restore the previously installed applications on the computer; querying the database to detect the applications previously installed in the computer; comparing the detected applications with the applications in the master library; and, restoring applications on the computer based on the results of the comparison.

Various additional objects, features and advantages of the present invention can be more fully appreciated with reference to the detailed description and accompanying drawings that follow.

DETAILED DESCRIPTION OF THE PREFERRED EMBODIMENTS

The present invention relates to a method for restoring application software on desktop computers, typically found in networked systems. As used herein, "desktop computers" refers to personal computers, such as those used in enterprise systems which may be non-mobile desktop computers, or portable (laptop) computers. Also, as used herein, the terms "restoration" or "restoring" refer to restoring or replacing current or later versions of software applications or components thereof. As will be discussed later in more detail, the method of the present invention is preferably conducted automatically, under software control with intervention by a system administrator on an as needed basis. For convenience, the automated method of the present invention "software express" (SE). The software express includes a detection and restoration component that functions to inventory applications on the desktop computer. This inventory is matched against a master library of applications. When a desktop computer is either reloaded or refreshed for a newer device, the software express restores all previously detected applications that are found within the master library. This component of the software express effectively integrates detections, installation and delivery of the managed master application library.

It should be noted here that although the following description explains the use of the SE in the context of a networked system, the SE can also be run from a non-networked environment, such as from a USB drive or a DVD.

Figure 1:
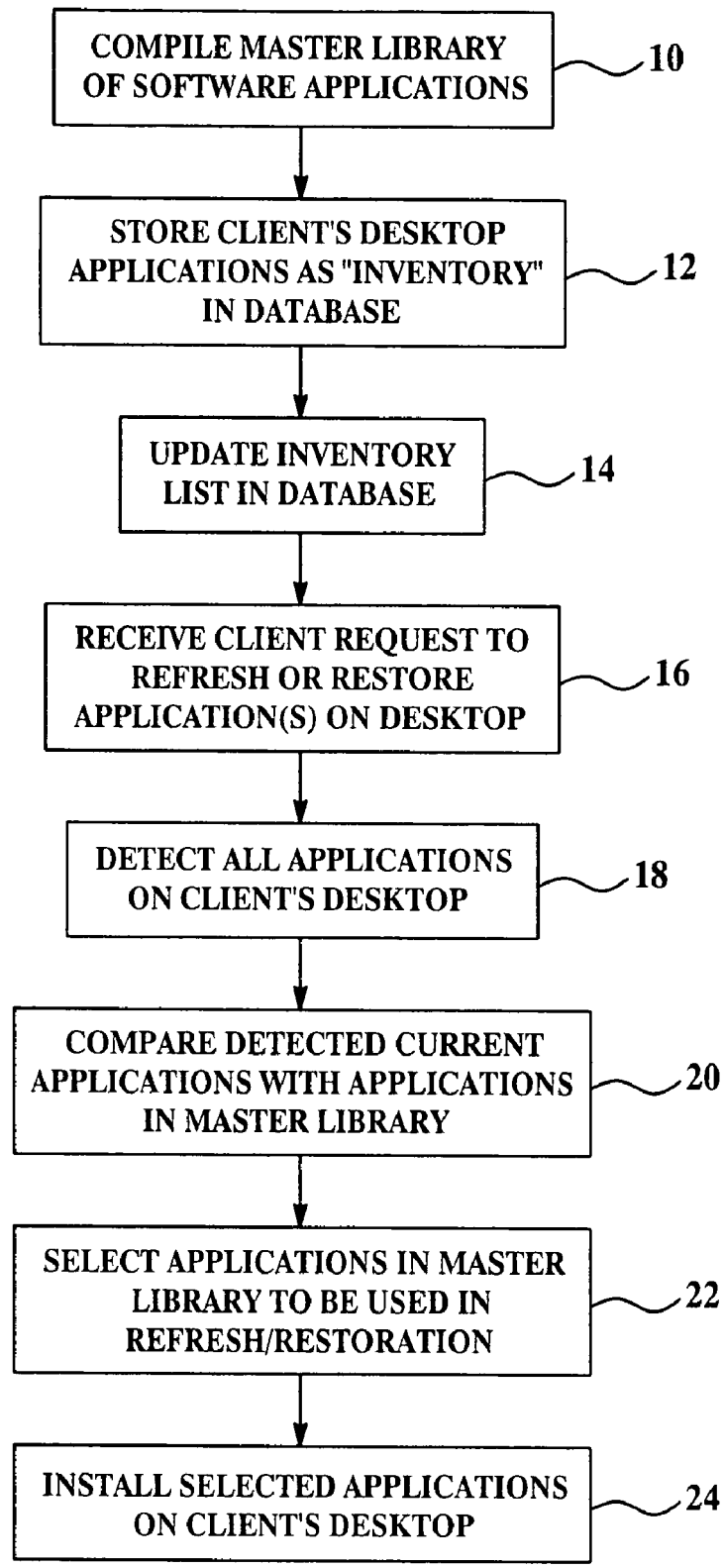
FIG. 1 is a flowchart showing the broad steps of a method for detecting and restoring software applications on desktop computers which forms the preferred embodiment of the invention.

Referring to FIG. 1, a master library of all known software applications is compiled at step 10. These applications comprise all of the software applications that may be used within the network, and typically may include multiple versions of the same application. At step 12, the SE stores all applications on the client's desktop in a database as the "inventory" that exists in the client's desktop at a particular point of time. This stored inventory information is later used in the restoration process. At step 14, the database is updated as needed to reflect any new software applications that might be added to the client's computer. At 16, the SE receives a request to refresh or restore applications previously existing on the desktop computer. The SE responds to the restore request at step 18 by detecting the current applications on the desktop, and then at step 20 by comparing the detecting current applications with applications present in the master library. At step 22, the SE selects the applications in the master library that are to be used in the desktop restoration. Finally, at step 24, the SE installs the selected applications from the master library onto the client's desktop.

Figure 2:
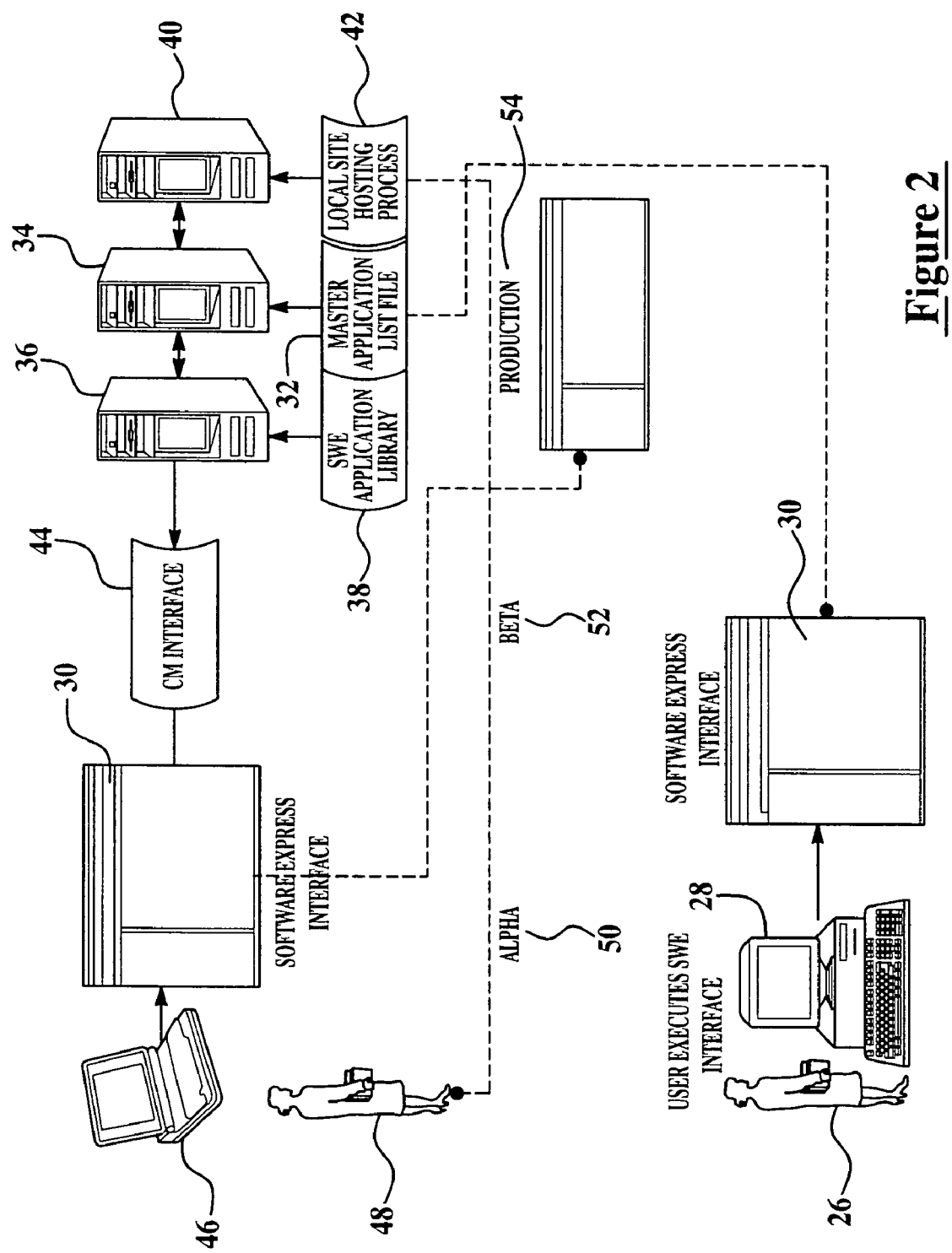
FIG. 2 is a diagrammatic view of a typical network showing interfaces and the location of files which are the subject of the inventive method.

The software application detection process used by the SE is shown in more detail in FIG. 2. As will be discussed below, the SE uses predefined scripted elements to examine the desktop client for all known applications installed on the desktop. Once this data is collected, it is placed in a SQl database. When the user or administrator needs to restore applications onto the client desktop, they execute the SE detection/restoration subcomponent. This subcomponent of the SE examines the previously recorded client application data and compares it against the master application library data. The application library data is managed by one or more administrators that place rules on each application item. For example, if the SE detects application X, version 1, 2, 3, 4, 5 but is instructed to restore only application X, version 6, this is accomplished through the detection/restoration subcomponent.

A client user 26 controls a desktop computer 28 which interfaces with the SE through a software express interface 30. The interface 30 includes appropriate screen icons and menus allowing the client 26 to interface with the SE. A master library of application files 32 is resident in a server 34. Server 34 is communicatively connected with a server 36 in which the SE application inventory information 38 is stored, and server 40 which facilitates local site hosting processes 42. The server 36 is coupled through a client management interface 44 and SE interface 30 to other desktop computers 46 in the network. Users or programmers 48, developing new software applications submit a request through a hosting process to have the new application hosted in SE. The hosted application within the SE requires an application (APP) wrapper. The wrapper is built with key elements that support the detection process using a standard certification and testing process. During the alpha phase 50, detection elements are added to the application script which is then tested and promoted into data. During the beta phase 52 of the development, the application is certified by the developer and then moved into production 54.

Figure 3:
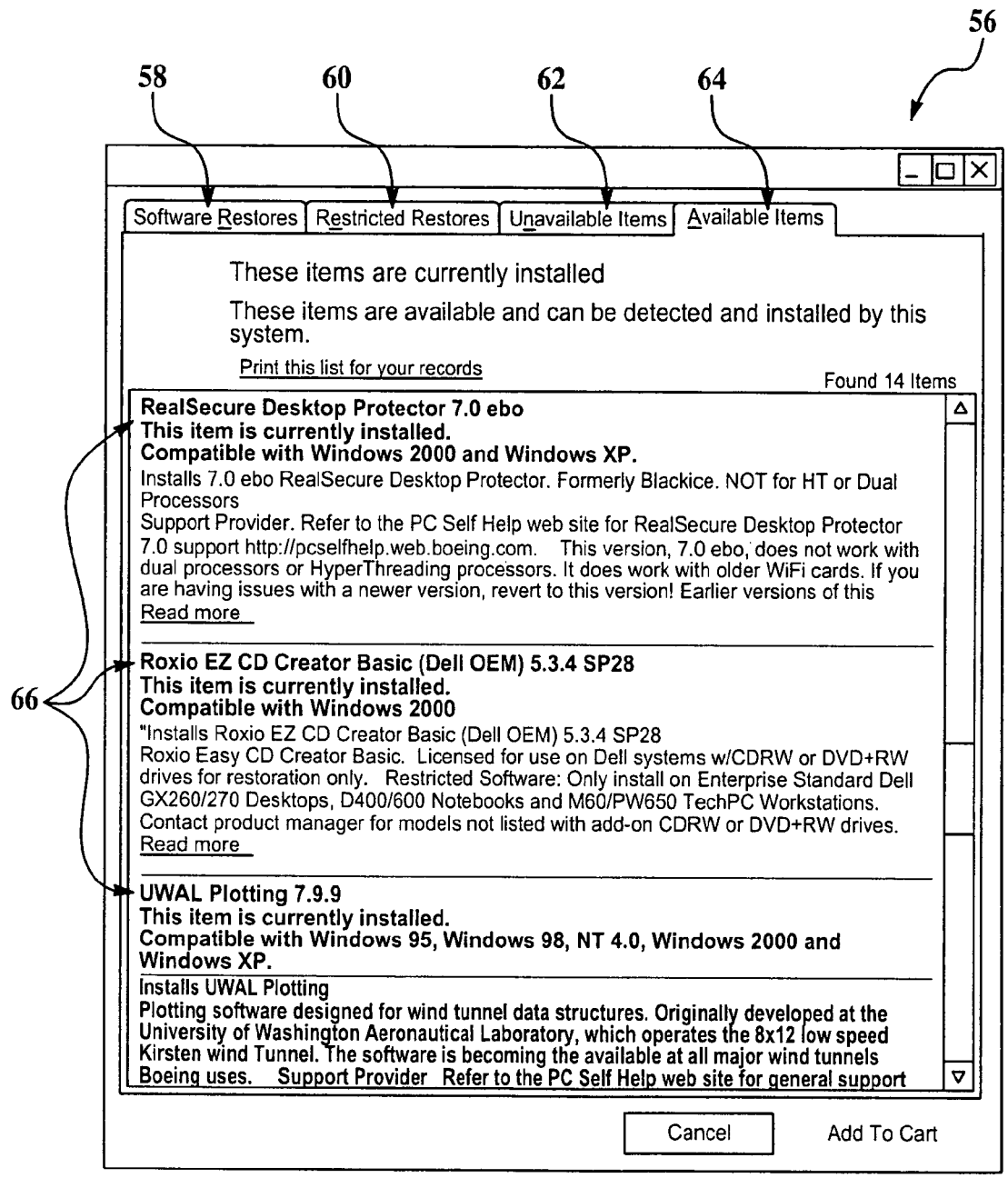
FIG. 3 is a software window displayed to a user on a computer screen, to aid a user in practicing the method of the present invention.

FIG. 3 shows a screen 56 forming part of the SE software interface 26 previously mentioned The screen 56 includes menu tabs 58, 60, 62, 64 which will be described in more detail. Information 66 related to software applications under the tabs 68-64 are displayed to aid the client user in requesting and completing software restorations.

The SE includes a software update feature that provides automated application update and restoration support. The SE utilizes header commands within its APP wrapper and MSI (Windows Installer) format data stored on the workstation to identify installed applications. The SE update allows installed applications to be tracked on the computer in a local file. The local file can be used to support the detection process and aid in identifying application upgrades and restorations. Automated upgrades or restorations can be initiated from the SE graphical user interface (GUI) or from a command line interface.

The operation of the SE update feature will now be described in more detail. Every hosted application within the SE system requires an application (APP) wrapper. Each APP wrapper contains a header and script body. The APP header contains the basic information for the application and is the section most important to application detection within the SE software update process. The header commands within the APP wrapper may be used to support application detection on the computer. The header commands may include, for example, KeyId, AltId, ProductVersion, KeyFile, Uninstall, and Reinstall.

In order to support application detection, the APP wrappers must have at least a valid KeyId and ProductVersion command. The KeyId command is the primary identifier of the APP and should be defined with a valid GUID value before the application can be detected. In order to support the release of upgrades, the ProductVersion command should have the proper application version set in accordance with standard versioning rules. The need for implementing the remaining commands is dependent on the type of application installation being wrapped and how that application is supported within the SE.

As the application is wrapped, the APP file (SE wrapper) is configured to support the SE software update detection which is based on the following checks for the application on the client:

A. MSI GUID (Value)
B. File (exists, date-time, version)
C. Directory (exists)
D. Registry (exists, Value)

The above checks are applied to the following SE commands supported with in the header of the APP files (Software Express wrapper).

KeyID: Only supports check type A
KeyFile: Only supports check types B, C and D
Uninstall: Only supports check types B, C and D
Reinstall: Only supports check types B, C and D
AltID: Only supports check type A Examples of each check type (KeyFile, KeyID, Uninstall, and Reinstall, AltID, and Check) are provided below, wherein the following terms shall have the following corresponding meanings.

KeyID—This field is used to support the SE software update (Detection) that identifies an application using a GUID "global unique identifier". This command is specific to the script header in the APP files. The command is used to identify the SE "APP" script for the SE detection, restoration and upgrade process.

KeyFile—The full path to the file, directory, or registry value that uniquely identifies the application is installed on the client. This identifier is used to detect whether an application is installed on the workstation. It is used to support the SE software update detection (application inventory) function. This command is set in the script header of an APP File.

Uninstall—The uninstall command can be used in the header of the script to support the removal of the application from the desktop. It also enables the right-click uninstall option in the graphical user interface when selecting an application (or Go\Uninstall from the Menu Bar). This command is specific to the script header in APP files.

Reinstall—The "Reinstall" command can be used in the header of a script to control the "action" and "mode" of a script when that script is inserted into the "Shopping Cart".

AltID—The Altid identifies application upgrades for APP scripts with different KeyId GUID's.

Check—This header command is used for validation checks in APP, FLD or APG files. It is useful for restricting or granting access to software based on any SE variable or workstation configuration. If the logic comparison(s) validates to true, the user can access the object. If the logic comparison(s) fail, the user cannot see the object through the user interface or install it using the installer command line utility. This [optional] command is specific to the script header in APP, FLD and APG files. It should be noted here that the Check command can be optionally extended with an additional parameter that allows a text message to be displayed to the user. This can be used to display a message about the restriction and\or direct the user to take further action. When the check command is used with the parameter displaying a text message, that message will be appended to the message defined in the "TIP" header. If the TIP header is not defined then the message from the check command will be used.

ProductVersion—The value of the ProductVersion is the version of the product in string format. The format of the string is as follows major.minor.build, The first field is the major version and has a maximum value of 255. The second field is the minor version and has a maximum value of 255. The third field is called the build version or the update version and has a maximum value of 65,535. It should be noted here that the Windows Installer uses only the first three fields of the product version. If a fourth field is included, the Windows installer ignores the fourth field.

In the case of MSI supported installations, if the application installation is a self contained MSI, then KeyId and ProductVersion commands should be set in the header. The KeyId command should be set to the MSI Product Code and the ProductVersion command set to the MSI 3 digit version number. The SE software update will automatically link the KeyId GUID to any installed MSI product codes with the same GUID values. The ProductVersion is used to match the wrapper with the correct MSI version number and identify if the installed version earlier, later or the same.

EXAMPLE 1

This Example shows the attributes needed in the script header to enable an application to be detected on the client by the SE update software component. In this script the "KeyID" attribute is used from the MSI "Product Code" as the signature to detect if the application is installed on the client.

```
Title Example (APP-2) Detection MSI Check
Version 1.0
ProductName %Title%
ProductVersion 1.0.0
KeyID {819FCDA5-D68B-4F67-AB29-246FDE62AF01}
```

-continued

```
Icon Red.ico
Tip "Installs %Title%
Details Details.rtf
Order 500
OS Windows 95, NT2k, XP
Set ProdCode="{819FCDA5-D68B-4F67-
    AB29-246FDE62AF01}"
Set Source="%ScrDir%\1.0"
Set ProgDir=%OS.ProgFiles%\AppTest\App-2
Set MSI="Example (APP-2)"
Set UninstChk="(%%Reg:"% Ext.UninstKey%\%KeyID%",
    UninstallString,NameExists%%==Yes)"
Uninstall %UninstChk%, Uninstall:
```

In this example the uninstall command also uses the "Product Code" to determine if the application is installed on the client. When the SE software update component is run it will evaluate the uninstall command and if it returns true (which it should if the application is installed) the application will show up in the "Available Items" tab in the SE update software cart.

Once the script has the necessary header information and is moved into a SE production folder, at the next inventory cycle the script header information will be read and placed in the master application list for that site. The location of the master application list (Detect.Dat) file is specified in the {server-file=} entry in the xSetup.ini and Installer.ini under the [Detect] section.

EXAMPLE 2

This example shows the attributes used in the script header to enable this application to be detected on the client by the SE update software component. In this example the "Uninstall" attribute is used to detect the application signature on the client.

In the script header below the Uninstall line is checking a variable UnistChk to see if the registry "value" stored in the variable is present on the client PC's registry. If the registry value exists in the client's registry then a state of "True" is returned to the system and will enable this application to be included in the SE update software process. This scripts application identifier is the path to the {13B81D14-BE13-438E-935A-5089B332670C} registry key on the client.

```
Ext.UninstKey =
HKLM\Software\Microsoft\Windows\CurrentVersion\
    Uninstall
ProdCode   = {13B81D14-BE13-438E-935A-5089B332670C}
Title Example (APP-3) Detection Uninstall
    Registry check
Version 1.0
ProductName %Title%
ProductVersion 1.0.0
Icon ADSAS.ico
Tip Installs %Title%
Details Details.rtf
Order 500
OS NT2K
Set ProdCode="{13B81D14-BE13-438E-
    935A-5089B332670C}"
Set UninstChk="(%%Reg:"(Ext.UninstKey\)
    (ProdCode)",,KeyExists%%==Yes)"
Uninstall (UninstChk),Uninstall:
```

In this example the uninstall command uses the "Product Code" to determine if the application is installed on the client. When the SE update software component is run it will evaluate the uninstall command and if it returns true (which it should if the application is installed) the application will show up in the "Available Items" tab in the SE update Software Cart.

In the case of non-MSI supported installations, along with the KeyId and ProductVersion Commands, at least one valid Uninstall, Reinstall, KeyFile command must be set. The Uninstall, Reinstall, and KeyFile commands contain the ability to check for file, directory, or registry values to determine if the application is installed. Only one of these commands is necessary to detect the installation of an application. If the SE APP wrapper supports uninstall or reinstall then the user need not take further action. If the wrapper does not support uninstall or Reinstall, then the user must use the KeyFile command. In any event, when multiple versions of the same application are available, the test used within the commands should be specific enough to isolate the application version. If the test is not specific enough, then the application wrapper may not be able to support the upgrade of the application.

EXAMPLE 3

This example shows the attributes needed in the script header to enable an application to be detected on the client by the SE update software component. In this script, the "KeyFile" attribute is used in conjunction with the "KeyID" attribute to detect the application on the client. Note that if the application being wrapped is a MSI (Microsoft Windows Installer) application, the MSI product code (GUID) must be used as the KeyID in the script for that application.

In the example shown below, the keyfile identifier is the path to the C:\Program Files\Apptest\App-1\TEST.DLL file on the client. Because the "Test.DLL" is not a MSI application, it is necessary to also include a KeyID GUID in the script header.

```
Example header information
Title Example (APP-1) Detection KeyFile Check
Version 1.0
ProductName %Title%
ProductVersion 1.0
Icon abaqus.ico
KeyID {11111111-1111-1111-1111-111111111111}
KeyFile "C:\Program Files\AppTest\App-1\Test.dll"
Tip Installs %Title%
Details details.rtf
Order 500
OS NT2K, XP
uninstall(%%Dir,"%OS.ProgFiles%\AppTest\App-
     1",Exists%%==Yes),uninstall:
Set Source=%ScrDir%
Set ProgDir=%OS.ProgFiles%\AppTest\App-1
```

Once the script has the necessary header information and is moved into an SE production folder at the next inventory cycle, the script header information will be read and placed in the master application list for that site. The location of the master application list (Detect.Dat) file is specified in the {serverfile=} entry in the xSetup.ini and Installer.ini under the [Detect] section.

The following are examples showing use of the KeyFile as a detection method. Note here that Keyfile should only be used if the script does not contain an Uninstall command.

EXAMPLE A

This example shows the method of using KeyFile for checking two locations to determine if the file exists:

```
KeyFile((%%File,C:\Palm\Palm.exe,Exists%%==Yes
)||(%%File,%ProgFiles%\Palm\Palm.exe,Exists%%=
=Yes))
```

EXAMPLE B

This example shows the method of using a registry value

```
KeyFile %HKCR\CLSID\{73A4C9C1-D68D-11D0-98BF-
00A0C90DC8D9}\LocalServer32\%
Returns the value of the LocalServer32
registry key
KeyFile(%%Reg:"%Ext.UninstKey%\%ProdCode%",Uni
nstallString,NameExists%%==Yes)
Checks registry location to determine if the
registry key exists
```

EXAMPLE C

This example shows the method of using

```
KeyFile to check the existence of a directory:
     KeyFile(%%Dir,"%OS.ProgFiles%\AppTest\App-
     1",Exists%%==Yes)
```

It should be noted here that, preferably, the method should be selected that provides the highest accuracy of determining if the value exists on the workstation that identifies a particular application is installed on the workstation. SE variables should be used in the KeyFile path statement. If the application file being used is in the C:\WINNT directory, then the %WinDir% variable should be used to account for change in the directory structure going from Windows 2000 to Windows XP.

EXAMPLE 4

This example shows which attributes are used in the script header to enable the application to be detected on the client by the SE update software component. In this example the "Uninstall" attribute is used in conjunction with the KeyID attribute to detect the application signature on the client.

The script header information below shows the Uninstall line checks for a string value on the client PC's registry. If the registry value exists in the client's registry then a state of "True" is returned to the system and will enable this application to be included in the Software Express update software process. This scripts application identifier is the path to the "The Example APP-4 is installed" string value in the Testing_value registry key on the client PC.

```
Full Registry Path = HKLM\SOFTWARE\Boeing\Software
    Express\Example-app-4\Testing_value\The Example
    APP-4 is installed
Title Example (APP-4) Detection Uninstall Registry
    value check
Version "1.0"
ProductName "%Title%"
ProductVersion "1.0"
Icon Icons\green.ico
KeyID {0AA49246-4E44-4445-9047-ACEA9A4DB145}
Tip "%Title%"
Details Details.rtf
Order 500
OS NT2K
Uninstall ("%HKLM\SOFTWARE\Boeing\Software
    Express\Example-app-4\Testing value%"=="The
    Example APP-4 is installed"),Uninstall:
```

In this example the uninstall command uses a registry value to determine if the application is installed on the client. When the SE update software component is run, if there is an associated KeyID in the script header and the uninstall command returns true (which it should if the application is installed) the application will show up in the "Available Items" tab in the SE update Software cart.

If the wrapper is supporting an upgrade to an existing APP or MSI installation, the user should include an AltId command for each previous KeyId or unique MSI Product Codes. If the MSI product code is used, it is not necessary to retain any APP wrappers for the previous application versions since the workstation will be queried directly for that MSI product code.

EXAMPLE 5

This example below shows the attributes in the script header that enables a previous version of an application to be detected on the client using the SE update software component and offer an upgrade to the newer version of that application.

In this example the "AltId" attribute is used to detect the previous version of the application signature on the client. For this example if the (MyApp_Ver1.0) is installed on the client and a newer version (MyApp_Ver2.0) has just been released into production and you want to offer (MyApp_Ver2.0) to those users you would need to add the AltID in the header of the new script which referenced the KeyID of the previous version.

```
Title Example (APP-6) Detection KeyID Version
    upgrade From (Example App-5)
Version 1.0
ProductName %Title%
ProductVersion 1.0.0
Icon ADSAS.ico
KeyID {FECC545D-839E-4965-81DD-DF5A531CBC09}
Tip Installs Aerodynamic Sources for AutoSea etc
    %ProductVersion%
Details Details.rtf
Order 500
OS NT2K, XP
Set ProdCode="{FECC545D-839E-4965-81DD-
    DF5A531CBC09}"
Set UninstChk="(%%Reg:"%Ext.UninstKey%\
    %ProdCode%",,KeyExists%%==Yes)"
Uninstall %UninstChk%,Uninstall:
AltID Yes,{45EF1073-7365-4A68-9E68-D8B02B971302}
```

When users run the SE "update software" component and selects the upgrade" option they should have the newer application available for them to install. It should be noted here that there may be circumstances when the upgrade can show up in the "Restricted Items" tab if the client does not meet the necessary criteria for example if there's a restriction placed on the application (OS, Global Group, License, etc.).

To satisfy a requirement that SE detects applications that are not in hosted in SE and have the ability to display information to users about those detected applications, the following example shows what information has to be present in the script header to accomplish the task.

EXAMPLE 6

In this example, shown below, header information is used to display a message to the user using the "Check" command.

```
Title MyApplication
Version 1.0
KeyID {D6EF78DE-A643-40E3-9830-F49646EC20DE}
KeyFile "C;\Program files\AppTest\App-9\MyApp.exe"
Details details.rtf
Check no
Begin
End
```

The information contained after the "check no," will be displayed to the user.

SE utilizes the "Check" command to restrict or grant access to applications that are host in the interface if the user or workstation meets the criteria of the check. Scripts are provided for applications in SE, as well as for applications not in SE. The format for the Check command can be structured differently for scripts detecting applications not in SE and the name of the .app will be different for scripts that only contain message text information (Message.app).

The following are examples of the use of KeyFile as a detection method. Note here that Keyfile should only be used if the script does not contain an Uninstall command.

EXAMPLE A

This example shows the method of using KeyFile for checking two locations to determine if the file exists:

```
KeyFile ((%%File,C:\Palm\Palm.exe,Exists%%=
    =Yes)||(%%File,%ProgFiles%\Palm\
    Palm.exe,Exists%%==Yes))
```

EXAMPLE B

This example shows the method of using a registry value:

```
KeyFile %HKCR\CLSID\{73A4C9C1-D68D-11D0-
    98BF-00A0C90DC8D9}\LocalServer32\%
Returns the value of the LocalServer32
registry key
KeyFile (%%Reg:"%Ext.UninstKey%\
    %ProdCode%",UninstallString,NameExists%%=
    =Yes)
Checks registry location to determine if the
registry key exists
```

EXAMPLE C

This example shows the method of using KeyFile to check the existence of a directory:

```
KeyFile (%%Dir,"%OS.ProgFiles%\AppTest\
App-1",Exists%%==Yes)
```

It should be noted here that the method selected for use should that which provides the highest accuracy of determining if the value exists on the workstation that identifies a particular application is installed on the workstation. SE variables in the KeyFile path statement should nbe used. If the application file being used is in the C:\WINNT directory, then the %WinDir% variable should be used to account for change in the directory structure going from Windows 2000 to Windows XP.

When the two header attributes are added to the script below:

```
KeyID {11111111-1111-1111-1111-111111111111}
KeyFile "C:\Program Files\AppTest\App-1\Test.dll"
``` and the user runs the "update Software" option, applications installed on the client will be detected. The application will show up on the "Available Items" tab in the update software cart.

After running the software update option, if the user uninstalls the application and runs the SE "Software Update" option, information about that application will show up in the "Software Restore" tab. This information is available because the application is in the list contained in the local.dat file but has not been detected on the client.

Any applications showing in the "Software Restore" tab are available for the user to install. Clicking on the "Add To Cart" button will insert all applications displayed on that tab into the SE Software Cart.

Clicking on the start button will start the install process of any applications added to the SE Software Cart. The Software Cart is the same cart that is used to install applications from the SE GUI.

The "Software Restores" window 58 displays any applications that need to be restored to the desktop computer.

The "Restricted Restores" 60 window displays any applications that need to be restored to the desktop computer. However these applications can not be installed on the user's desktop because the application is restricted for install or the application does not support the user's Operating System.

The "Unavailable Items" 62 window displays a list of applications found on the user's desktop computer. These are applications that have been detected on the user's computer but are not associated to a SE application install.

The "Available Items" 64 window displays all detected applications found on your desktop computer.

Every SE instance must have a correctly configured configuration file. Settings within the configuration file depict what options are available within the SE instance. Before SE software updates can be turned on for an instance, a master detection file must be built and distributed to each SE instance. The master detection file is a filtered list of APP headers built from a database that contains all of the known APP headers within the SE. The location of the master list is be specified in the server field of the configuration file. To support restoration, the configuration file must have the local field updated with a path to a filename on the computer. The SE software update system will write to this file location every time an application detection process is run, updating the file with the latest details about installed applications found within the master list and any applications installed from MSI.

The table shown below provides an illustration of the [Detect] section and the attributes that should to be added to the xSetup.ini and Installer.ini to support the SE software update function.

| [Detect] | |
|---|---|
| serverfile=\\nt-iss-1\sdw\Lists\detect.dat | ServerFile is the path to the site's master inventory file. This file is used by Software Express to match detected applications on the local machine against the master inventory file. |
| localfile=%Os.AppData%\SoftwareExpress\Region\local.dat | Localfile is the location that Software Express creates the local inventory file that contains information about what applications were detected on the local machine |
| ShowRestricted=YES | ShowRestricted controls the default tab setting for the "Restricted Restores" tab in the detection cart. Yes = Sets the default for the tab to be displayed. NO = Sets the default not to show. Note: If no entry is given the default is automatically set to NO. |
| ShowUnAvailable=Yes | ShowUnAvailable controls the default tab setting for the "UnAvailable Items" tab in the detection cart. Yes = Sets the default for the "UnAvailable Items" tab to be displayed. NO = Sets the default not to show. (If no entry given, default is automatically set to NO) |
| ShowAvailable=Yes | ShowAvailable controls the default tab setting for the "Available Items" tab in the detection cart. Yes = Sets the default for the tab to be displayed. NO = Sets the default not to show. Note: If no entry is given the default is automatically set to NO. |
| ShowTracked= | ShowTracked controls the default tab setting for the "Tracked Items" tab in the detection cart. Yes = Enables the tab to be displayed. NO = Hides the tab. Note: If no entry is given the default is automatically set to NO. |

| | -continued | |
|---|---|---|
| [Detect] | | |
| RestoreTitle="Click here to restore your software" | Configures the Restore Title Text in the balloon popup when the Restore Cart is displayed to the user. | |
| RestoreText="Click on the Restore Restricted tab to view specific software that cannot be restored | Configures the Restore Text in the balloon popup when the Restore Cart is displayed to the user. | |
| UpgradeTitle="Click here to upgrade your software" | Configures the Upgrade Title Text in the balloon popup when the Upgrade Cart is displayed to the user. | |
| UpgradeText="Click on the Upgrade Restricted tab to view specific software that cannot be upgraded" | Configures the Upgrade Text in the balloon popup when the Upgrade Cart is displayed to the user. | |

The following table shows the command line switches for the software update installer.

| | |
|---|---|
| detect | Will spawn the detection process detection without evoking an install. Note: Combine with silent switch to make the detection process silent (Installer only). |
| silent | Will prevent the dialogs from being seen |
| default | Will automatically AddToCart, Cart will be installed |
| Update | Opens the first "Update Software" window (xSetup and Installer). Note: Combine with silent or default switches to automate through the defaults (Installer only) |
| Upgrade | Automates to the upgrade software window (xSetup and Installer). Note: Combine with silent or default switches to force automated upgrades (Installer only). |
| Restore | Automates to the restore software window (xSetup and Installer). Combine with silent or default switches to automated restores (Installer only). |

Although this invention has been described with respect to certain exemplary embodiments, it is to be understood that the specific embodiments are for purposes of illustration and not limitation, as other variations will occur to those of skill in the art.

What is claimed is:

1. An automated method for restoring software applications previously installed on a desktop computer comprising the steps of:
   (A) storing information representing an inventory of the applications installed on the computer, said previously installed applications determined by applications present in said computer at a selected point in time prior to the restoring process, said inventory stored in a local file located in the computer, the applications each further comprising an application wrapper that includes a header command to identify each of the installed applications;
   (B) generating and maintaining a library of known software applications comprising said previously installed applications including providing restoration rules imposed by an administrator for said software applications including an allowed restoration version for a respective application;
   (C) receiving a request to restore one or more of said previously installed applications on the computer, said restoring comprising determining said previously installed applications by reading said inventory from said local file and replacing said previously installed applications with a corresponding previously installed version or later version from said library according to said imposed restoration rules; and,
   (D) restoring those applications in the stored inventory that are present in the library according to an automated process, said automated process comprising steps (C) and (D).

2. The method of claim 1, wherein the step of (D) comprises detecting the software applications stored on the desktop computer by examining said inventory.

3. The method of claim 2, wherein the step of detecting the applications is performed using predefined scripted elements.

4. The method of claim 1, wherein step (D) includes:
   comparing the software applications in the stored inventory with the applications in the library, and
   selecting those applications in the inventory that are found in the library.

5. The method of claim 4, wherein selecting the applications includes choosing a specific version of the selected application, and step (D) is performed by restoring the specific version of the application.

6. The method of claim 1, wherein step (D) includes checking the library for updated versions of the applications in the stored inventory, and restoring the updated versions.

7. The method of claim 1, wherein the header command includes at least one of KeyId, AltId, ProductVersion, KeyFile, Uninstall, or Reinstall.

8. An automated method for restoring software applications previously installed on a desktop computer, comprising the steps of:
   (A) generating and maintaining a library of software applications comprising said previously installed applications including providing restoration rules imposed by an administrator for said software applications including an allowed restoration version for a respective application;
   (B) storing information identifying the software applications previously installed on the computer, said previously installed applications determined by applications present in said computer at a selected point in time prior to the restoring process, said identifying information stored in a local file located in the computer, each installed application further comprising an application wrapper having header commands to identify the installed application;
   (C) reading the information from the local file stored in step (B) to determine said previously installed applications;
   (D) matching the applications identified by the information read in step (C) with the applications in the library provided in step (A); and,
   (E) restoring said previously installed software applications from the library based on matches resulting from the step (D), said restoring comprising an automated process of replacing said previously installed applications with a corresponding previously installed version or later version from said library according to said imposed restoration rules, said automated process comprising steps (C), (D), (E).

9. The method of claim 8, wherein step (C) is performed remotely within a networked system.

10. The method of claim 8, wherein step (C) is performed using predefined scripted elements associated with each of the applications installed on the computer.

11. The method of claim 8, further comprising the step of choosing an updated version of a software application selected as a match, and wherein step (E) includes installing the chosen updated version of the software on the computer.

12. The method of claim 8, wherein step (D) includes checking the library for updated versions of the applications previously installed on the computer, and installing the updated versions on the computer.

13. The method of claim 8, wherein the method further comprises adding an identifying script to each of the files used in the reading and matching steps.

14. An automated method for restoring software applications installed on a computer, comprising the steps of:
- (A) generating a database representing an inventory of software applications previously installed on the computer, said previously installed applications determined by applications present in said computer at a selected point in time prior to the restoring process, said database comprising local files located in the computer;
- (B) generating and maintaining a master library of software applications that include the software applications previously installed in the computer including providing restoration rules imposed by an administrator for said software applications including an allowed restoration version for a respective application;
- (C) receiving a request to all of the previously installed applications on the computer;
- (D) querying the database generated in step (A) including reading information from said local files to detect the applications previously installed in the computer;
- (E) comparing the applications detected in step (D) with the applications in the master library generated in step (B);
- (F) restoring applications on the computer based on the results of the comparison performed in step (E), said restoring comprising replacing said previously installed applications with a corresponding previously installed version or later version from said master library according to said imposed restoration rules, wherein steps (D), (E), and (F) are carried out according to an automated process; and
- (G) placing each of the software applications in a wrapper having a header containing information identifying the application, and wherein the querying performed in step (D) includes reading the contents of the headers for each of the applications in the inventory.

15. The method of claim 14, further comprising the step of storing the database on the computer.

16. The method of claim 14, wherein:
step (E) includes selecting applications in the master library that match the detected applications, and step (F) is performed using the selected applications.

17. The method of claim 16, wherein selecting the applications includes choosing a specific version of the selected application, and step (F) is performed by restoring the specific version of the application.

18. The method of claim 14, wherein step (E) includes checking the master library for updated versions of the applications in the inventory, and step (F) includes restoring the updated versions.

19. The method of claim 14, wherein steps (D) and (E) are performed remotely within a networked system.

* * * * *